(12) United States Patent
Liu

(10) Patent No.: US 9,612,696 B2
(45) Date of Patent: Apr. 4, 2017

(54) SENSING ELECTRODES AND SENSING METHOD THEREOF

(71) Applicant: MStar Semiconductor, Inc., Hsinchu Hsien (TW)

(72) Inventor: Tzu-Wei Liu, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 158 days.

(21) Appl. No.: 14/294,247

(22) Filed: Jun. 3, 2014

(65) Prior Publication Data

US 2014/0362010 A1    Dec. 11, 2014

(30) Foreign Application Priority Data

Jun. 5, 2013   (TW) .............................. 102119958 A

(51) Int. Cl.
    *G06F 3/041*   (2006.01)
    *G06F 3/044*   (2006.01)

(52) U.S. Cl.
    CPC ............ *G06F 3/044* (2013.01); *G06F 3/0418* (2013.01); *G06F 2203/04112* (2013.01)

(58) Field of Classification Search
    CPC ....... G06F 3/041; G06F 3/044; G06F 3/04112
    USPC ................................................ 345/173–179
    See application file for complete search history.

(56) References Cited

U.S. PATENT DOCUMENTS

| | | | | |
|---|---|---|---|---|
| 2006/0097991 A1* | 5/2006 | Hotelling | .............. | G06F 3/0416 345/173 |
| 2010/0123670 A1* | 5/2010 | Philipp | ................... | G06F 3/044 345/173 |
| 2011/0242027 A1* | 10/2011 | Chang | ................... | G06F 3/0412 345/173 |
| 2011/0291939 A1* | 12/2011 | Tsukahara | ............... | G06F 3/044 345/168 |
| 2012/0256872 A1* | 10/2012 | Kawaguchi | ............. | G06F 3/044 345/174 |
| 2013/0140061 A1* | 6/2013 | Lim | ........................ | G06F 3/044 174/255 |
| 2013/0207934 A1* | 8/2013 | Jang | ...................... | G06F 3/0416 345/174 |

FOREIGN PATENT DOCUMENTS

| | | |
|---|---|---|
| TW | 390521 U | 5/2000 |
| TW | 201220158 A | 5/2012 |
| WO | 2012053792 A2 | 4/2012 |

OTHER PUBLICATIONS

Taiwan Office Action dated Nov. 25, 2014, 11 pages.
SIPO Office Action, Sep. 28, 2016, 9 pages.

* cited by examiner

*Primary Examiner* — Kent Chang
*Assistant Examiner* — Mark Edwards
(74) *Attorney, Agent, or Firm* — Edell, Shapiro & Finnan, LLC

(57) ABSTRACT

A plurality of dummy lines are arranged between a plurality of sensing electrode unit pairs to compensate a capacitance sensing value imbalance caused by two sensing electrodes. Further, a coordinate compensation value is calculated according to a layout of electrodes and wires to alleviate or reduce a ripple effect of sensed position errors. As such, sensing accuracy of a touch sensing apparatus is improved.

20 Claims, 13 Drawing Sheets

SENSING ELECTRODES AND SENSING METHOD THEREOF

This application claims the benefit of Taiwan application Serial No. 102119958, filed Jun. 5, 2013, the subject matter of which is incorporated herein by reference.

BACKGROUND OF THE INVENTION

Field of the Invention

The invention relates in general to a touch control panel, and more particularly, to sensing electrodes on a touch control panel and a sensing method thereof.

Description of the Related Art

Touch panels are a large-scale industry. Various kinds of electronic products employ touch panels as an essential input/output device for a human-machine-interface (HMI). The performance of touch panels is chiefly determined by sensing electrodes and a logic circuit coupled to the sensing electrodes. The designs and quality of electrodes influence the performance of touch panels.

In general, sensing electrodes of a touch panel are formed on a transparent substrate. Light emitted by a display apparatus goes through the transparent substrate to be presented to a viewer. The sensing electrodes formed on the transparent substrate include multiple electrodes, which are coupled to a logic circuit via multiple wires.

A performance standard that users demand on touch panels rises as the resolution of display apparatuses continues to increase. In order to increase touch control performances of touch control apparatus, such as the resolution, accuracy, and sensing speed for objects moving at a high speed, all require fitting larger numbers of electrodes and wires into a limited touch control area.

After fitting in large numbers of electrodes and wires, it is frequent that sensed coordinate positions obtained by the sensing electrodes are deviated from actual values due to physical properties caused by geometric shapes of the electrodes, as well as actual routing and layout of the wires. Therefore, there is a need for a good sensing electrode design and associated sensing method for compensating the deviated sensed coordinate positions.

SUMMARY OF THE INVENTION

The present invention discloses a sensing method for a touch control apparatus to perform sensing from a sensing electrode. The sensing electrode includes a plurality of first sensing electrode units. The sensing method includes: performing sensing by the plurality of first sensing electrode units to obtain a sensed coordinate position; calculating a coordinate compensation value by the sensed coordinate position according to a layout of the sensing electrode; and compensating the sensed coordinate position according to the coordinate compensation value to obtain a coordinate position.

The present invention further discloses a sensing method for a touch control apparatus to perform sensing from a sensing electrode. The sensing electrode includes a plurality of first sensing electrode units arranged along a first direction, and a plurality of dummy lines arranged between the first sensing electrode units. The sensing method includes: performing sensing by the first sensing electrode units; compensating a capacitance sensing value of the first sensing electrode units according to a compensation value; performing sensing by the first sensing electrode units; calculating a value in a sensed coordinate position corresponding to the first direction according to a sensed result of the first sensing electrode units; calculating a capacitance compensation value of a second direction according to the value of the first direction and a capacitance compensation function associated with a capacitance sensing value sensed by at least one of the dummy lines; and calculating a value in the sensed coordinate position corresponding to the second direction according to the capacitance compensation value and the sensed result of the first sensing electrode units to obtain the sensed coordinate position.

The present invention further discloses a sensing electrode formed on a substrate of a touch control apparatus. The sensing electrode includes a plurality of sensing electrode pairs. Each of the sensing electrode pairs includes a first sensing electrode unit, and a second sensing electrode unit corresponding to the first sensing electrode unit. The first sensing electrode unit includes at least one first electrode, a first wire coupled to the at least one first electrode, at least one second electrode corresponding to the at least one first electrode, and a second wire coupled to the at least one second electrode. The second sensing electrode unit includes at least one third electrode, a third wire coupled to the at least one third electrode, at least one fourth electrode corresponding to the at least one third electrode, and a fourth wire coupled to the at least one fourth electrode.

In conclusion, in the present invention, a plurality of dummy lines are arranged between a plurality of sensing electrode pair units to compensate a capacitance sensing value imbalance caused by two sensing electrodes. Further, according to a coordinate compensation value calculated according to the electrodes and a wire layout, a ripple effect of a sensed position error resulted by the imbalance is alleviated or eliminated, thereby enhancing sensing accuracy of a touch control apparatus.

The above and other aspects of the invention will become better understood with regard to the following detailed description of the preferred but non-limiting embodiments. The following description is made with reference to the accompanying drawings.

DETAILED DESCRIPTION OF THE INVENTION

Embodiments of the present invention are described in detail below. Apart from the disclosed embodiments, the present invention is also applicable to other embodiments. The scope of the present invention is not limited by the embodiments, and is defined in accordance with the appended claims. To better describe the contents of the present invention to one person skilled in the art and to keep the drawings clear, certain sizes and other associated scales may be emphasized to appear exaggerated, with unrelated details not entirely depicted.

Figure 1A:
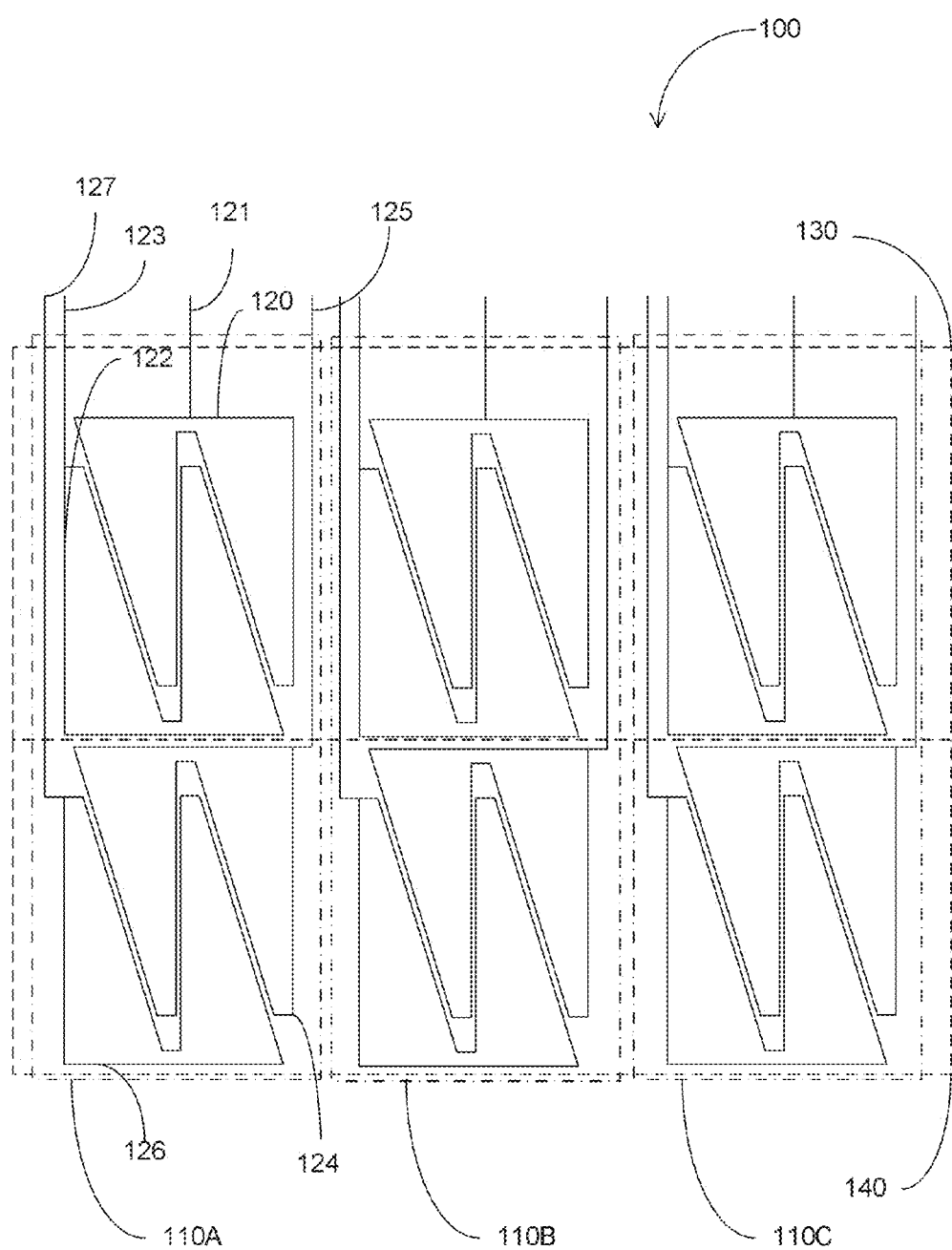
FIG. 1A is a schematic diagram of a sensing electrode according to an embodiment of the present invention.

FIG. 1A shows a schematic diagram of a sensing electrode 100 according to an embodiment of the present invention. The sensing electrode 100 is formed on a substrate (not shown) of a touch control apparatus, e.g., on a surface of the substrate or in the substrate. The present invention does not limit properties of the substrate. For example, the properties may include the shape, structure and material of the substrate.

The sensing electrode 100 includes a plurality of sensing electrode unit pairs. As shown in FIG. 1A, the sensing electrode unit pairs include three sensing electrode unit pairs 110A, 110B and 110C arranged along a first direction. Each of the sensing electrode unit pairs 110A, 110B and 110C includes a first sensing electrode unit arranged along a second direction and a second sensing electrode unit corresponding to the first sensing electrode unit. Taking FIG. 1A for example, the first sensing electrode unit may be referred to as an upper sensing electrode unit, and the second sensing electrode unit may be referred to as a lower sensing electrode unit. As a whole, all of the first sensing electrode units of the sensing electrode unit pairs 100A, 110B and 110C are collectively referred to as a first sensing electrode row 130, or referred to as an upper sensing electrode row 130. Similarly, all of the second sensing electrode units of the sensing electrode unit pairs 110A, 110B and 110C are collectively referred to as a second sensing electrode row 140, or referred to as a lower sensing electrode row 140.

In one embodiment, an arrangement direction of the parallel first sensing electrode row and second sensing electrode row are referred to as the first direction, a first axial direction, or the X-axis. An arrangement direction of the plurality of parallel second electrode unit pairs 110 is referred to as the second direction, a second axial direction, or the Y-axis. The first direction may be perpendicular to the second direction. A coordinate position of the sensing electrode 100 may also be represented by coordinates in the first direction and second direction.

The first sensing electrode unit includes a first sensing electrode group, and a second sensing electrode group corresponding to the first sensing electrode group. The first sensing electrode group includes at least one first electrode 120, and a first wire 121 coupled to the at least one first electrode 120. The second sensing electrode group includes at least one second electrode 122, and a second wire 123 coupled to the at least one second electrode 122. In the embodiment shown in FIG. 1A, the first sensing electrode unit includes two first electrodes 120 having planar contours analogous to triangles or trapezoids, and two second electrodes 122 corresponding to the first electrodes 120 and having planar contours analogous to triangles or trapezoids. These two groups of first electrodes 120 and second electrodes 122 having similar planar contours but mutually unconnected are coupled to the first wires 121 and the second wire 123, respectively. The planar contours of the first electrode 120 and the second electrode 122 are not limited by the present invention, and may be triangles, triangle-like trapezoids, or polygons. The first wire 121 and the second wire 123 are extended toward the same direction to couple to a logic circuit of the touch control apparatus.

Similarly, the second sensing electrode unit includes a third sensing electrode group, and a fourth sensing electrode group corresponding to the third sensing electrode group. The third sensing electrode group includes at least one third electrode 124, and a third wire 125 coupled to the at least one third electrode 124. The fourth electrode sensing group includes at least one fourth electrode 126, and a fourth wire 127 coupled to the at least one fourth electrode 126. In the embodiment shown in FIG. 1A, the second sensing electrode unit includes two third electrodes 124 having planar contours analogous to triangles or trapezoids, and two fourth electrodes 126 corresponding to the third electrodes 124 and having planar contours analogous to triangles or trapezoids. The two groups of third electrodes 124 and fourth electrodes 126 having similar planar contours but mutually unconnected are coupled to the third wire 125 and the fourth wire 127, respectively. The planar contours of the third electrode 124 and the fourth electrode 126 are not limited by the present invention, and may be triangles, triangle-like trapezoids, or polygons. The third wire 125 and the fourth wire 127 are extended toward the same direction to couple to the logic circuit of the touch control apparatus.

In one embodiment of the present invention, the planar contour of the first electrode 120 is equal to that of the third electrode 124, and the planar contour of the second electrode 122 is equal to that of the fourth electrode 126. The first wire 121, the second wire 123, the third wire 125 and the fourth wire 127 are all extended toward the second direction, and couple to the logic circuit of the touch control apparatus.

In the sensing electrode 100 in FIG. 1A, each of the sensing electrode unit pairs 110A, 110B and 110C forms two upper and lower bars, or two sensor bars. The numbers of electrodes included in the sensing electrode unit pairs 110A, 110B and 110C may be different. In one embodiment, the sensing electrode includes a first sensing electrode unit pair and a second sensing electrode unit pair. The first sensing electrode unit pair includes N first electrodes 120, N second electrodes 122, N third electrodes 124, and N fourth electrodes 126. The second sensing electrode unit pair includes M first electrodes 120, M second electrodes 122, M third electrodes 124, and M fourth electrodes 126. In one embodiment, N may be equal to 1. In another embodiment, M may be different from N.

Figure 1B:
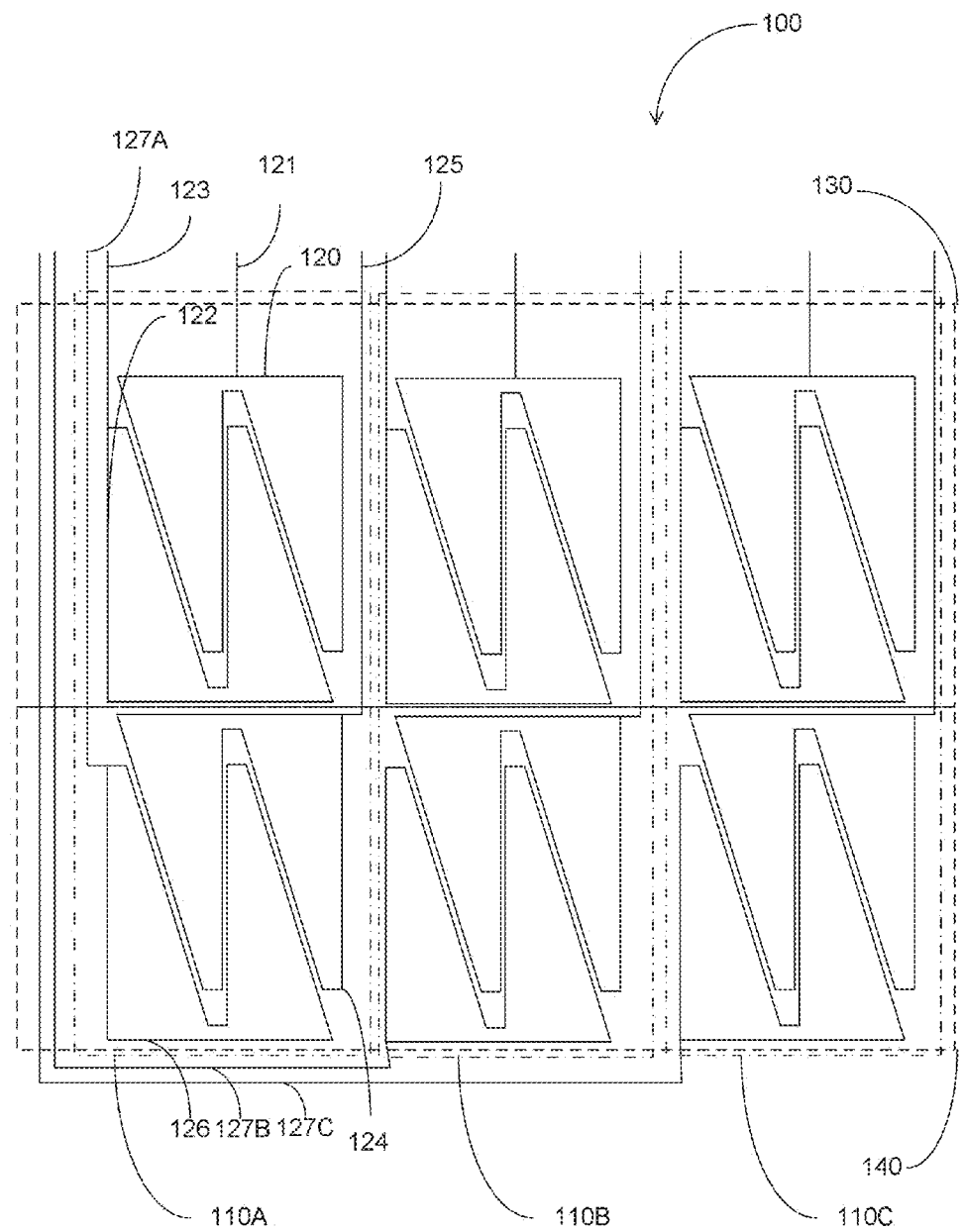
FIG. 1B is a schematic diagram of a sensing electrode according to another embodiment of the present invention.
Figure 1C:
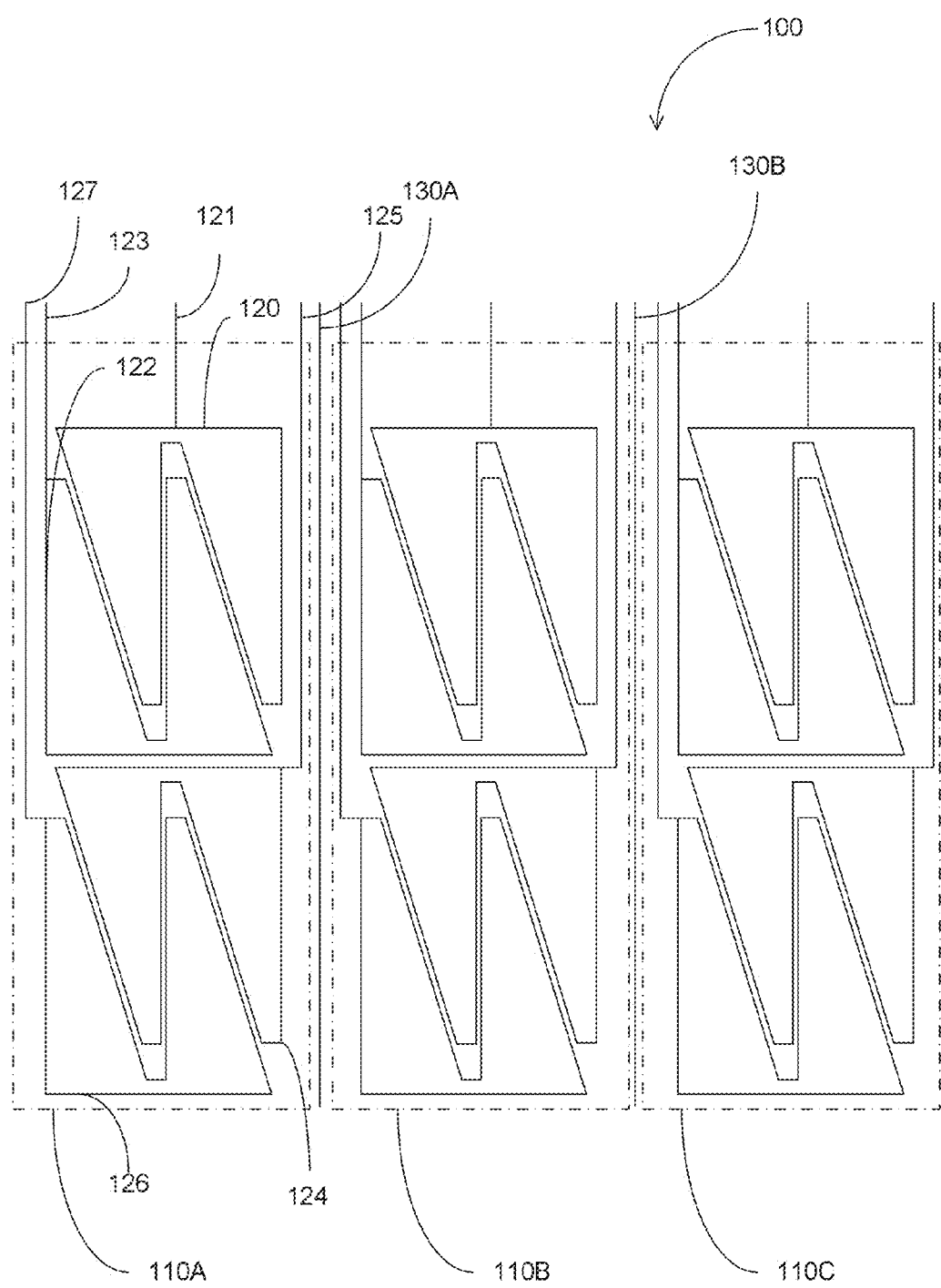
FIG. 1C is a schematic diagram of a sensing electrode according to another embodiment of the present invention.
Figure 1D:
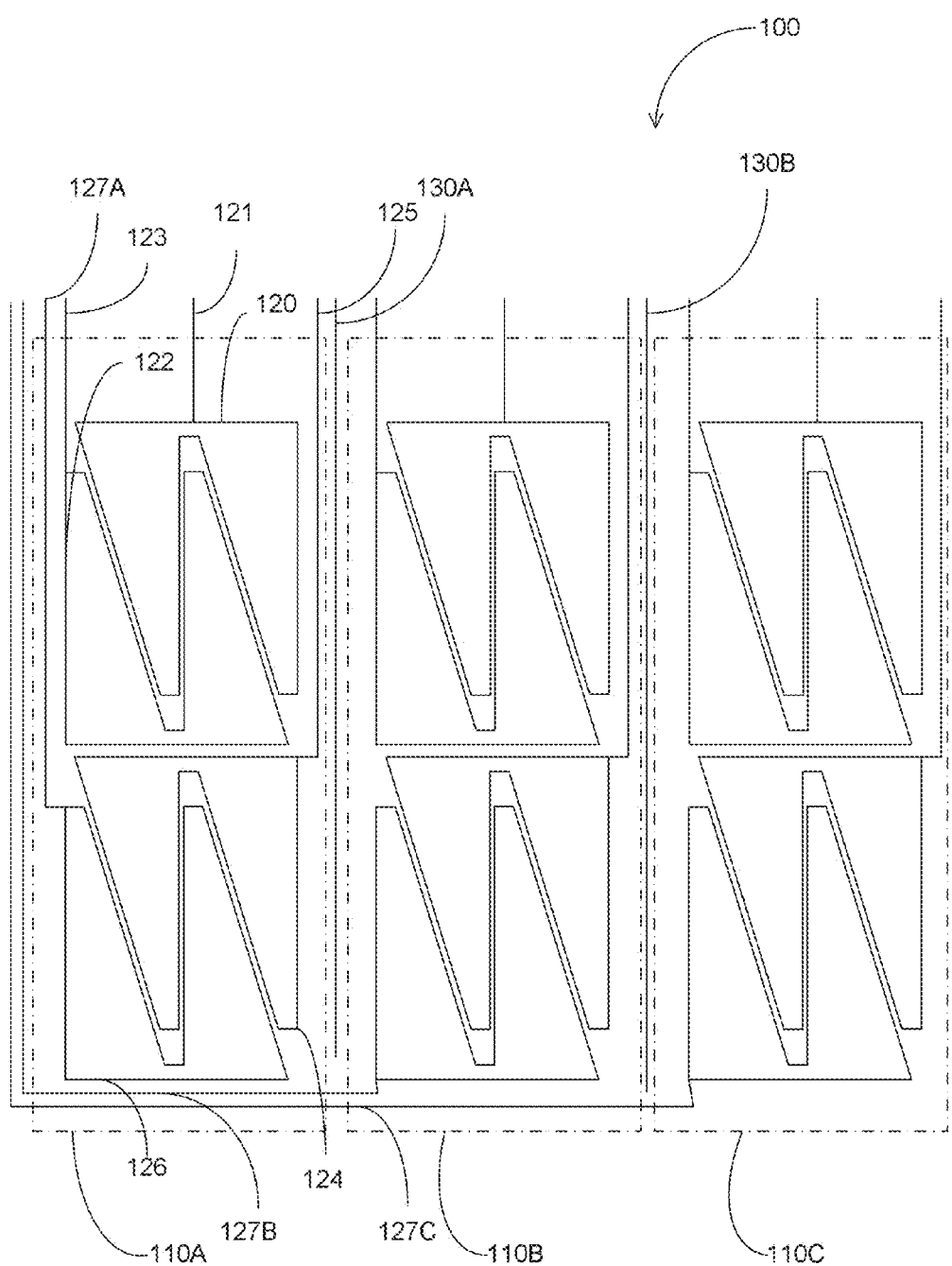
FIG. 1D is a schematic diagram of a sensing electrode according to another embodiment of the present invention.
Figure 1E:
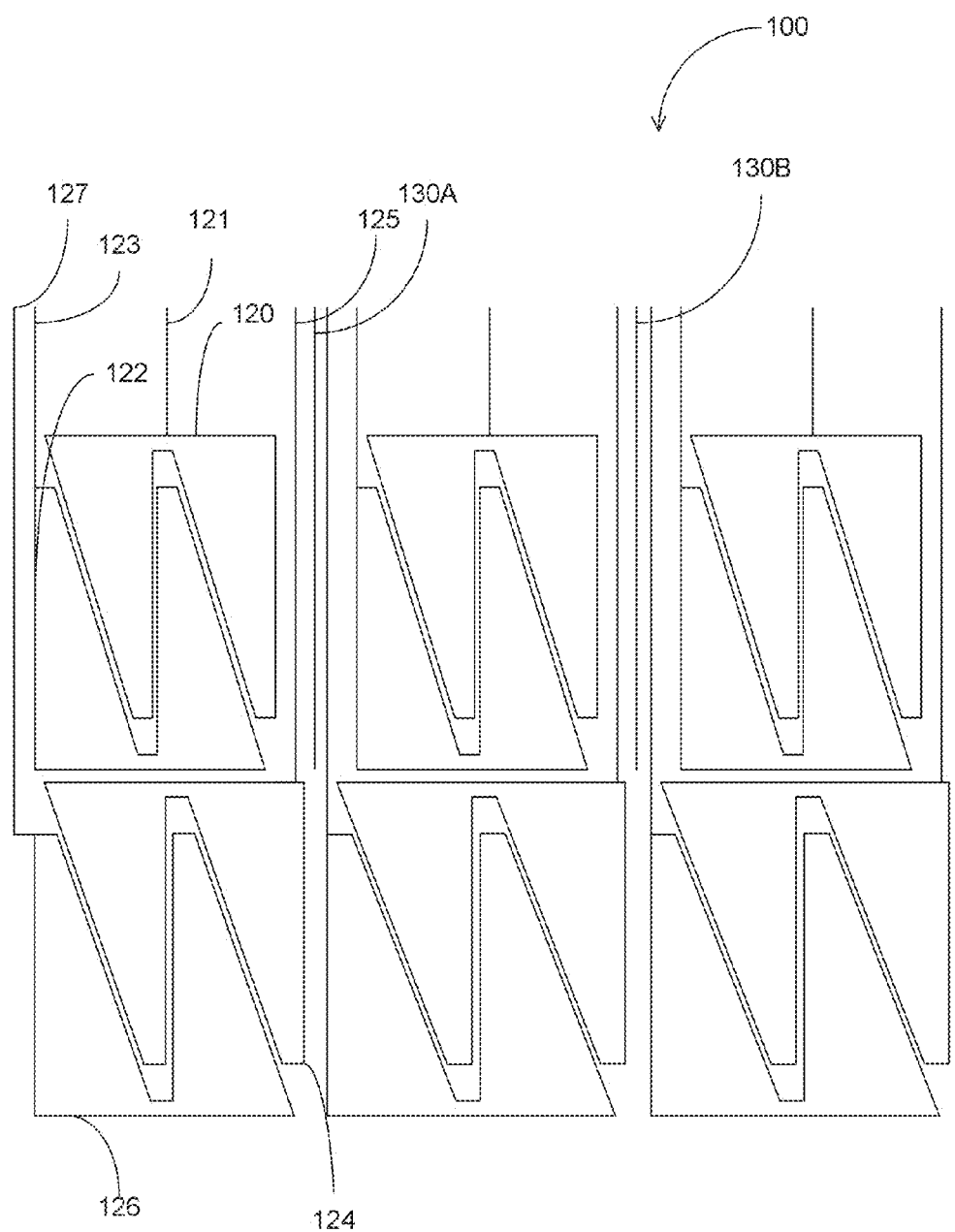
FIG. 1E is a schematic diagram of a sensing electrode according to another embodiment of the present invention.
Figure 1F:
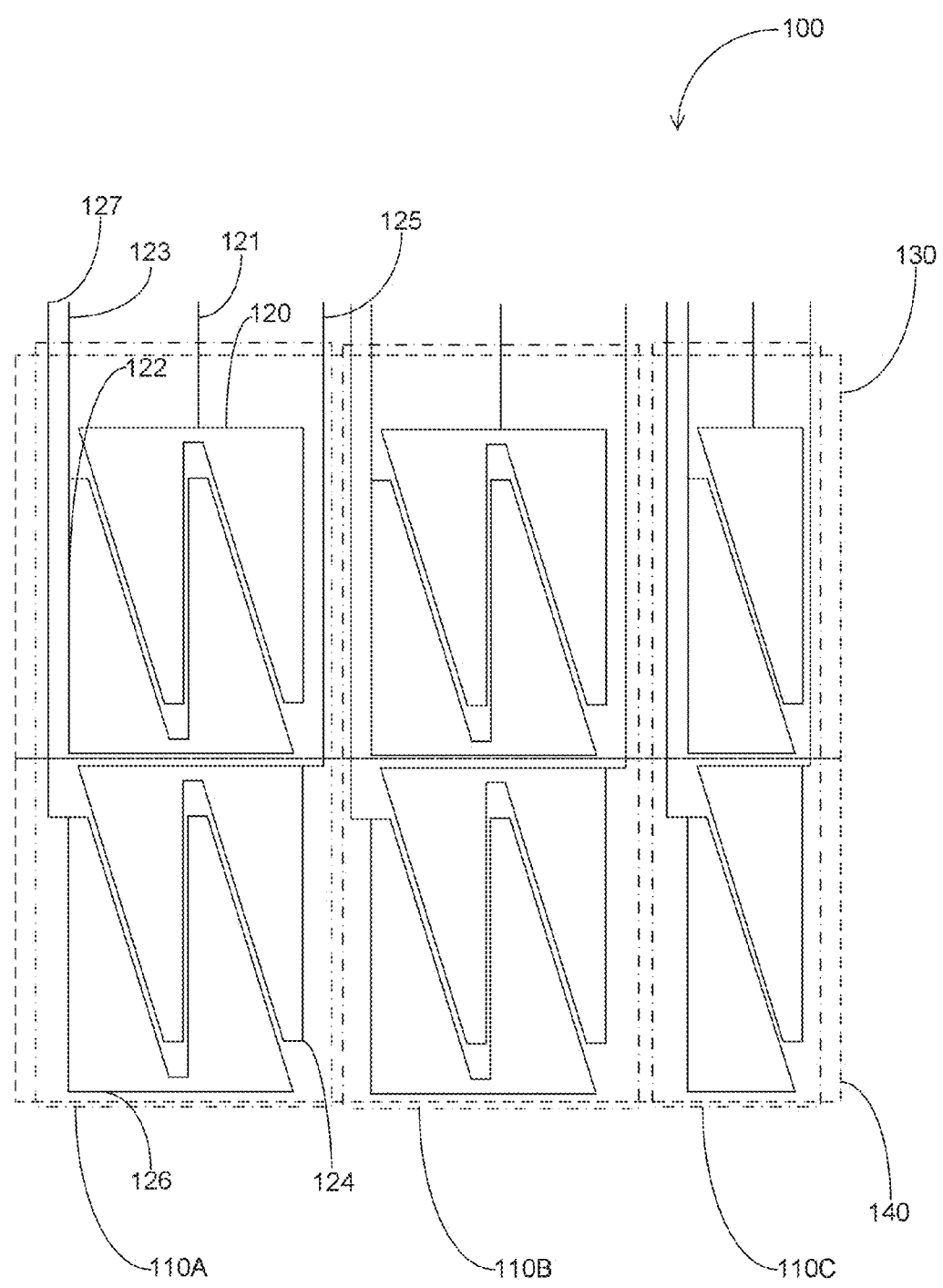
FIG. 1F is a schematic diagram of a sensing electrode according to another embodiment of the present invention.

FIG. 1F shows a schematic diagram of a sensing electrode according to another embodiment of the present invention. One difference of the embodiment in FIG. 1F from that in FIG. 1A is that, the number of electrodes in the sensing electrode unit pair 100C is different from those of other sensing electrode unit pairs. The sensing electrode unit pair 100C only includes one first electrode 120, one second electrode 122, one third electrode 124, and one fourth electrode 126. As a length of the substrate may not be an integral multiple of one sensing electrode unit pair, thus, two or more types of sensing electrode unit pairs having different numbers of electrodes may be present on the same substrate. In one embodiment, sensing electrode unit pairs having a special number of electrodes may be arranged at border regions to favor individual calculations for sensed coordinate positions.

The logic circuit of the touch control apparatus is capable of calculating first sensed coordinates (X1, Y1) of the first sensing electrode row according to capacitance changes detected by the first wire 121 and the second wire 123 of each first sensing electrode unit. Similarly, the logic circuit of the touch control apparatus is capable of calculating second sensed coordinates (X2, Y2) of the second sensing electrode row according to capacitance changes detected by the third wire 125 and the fourth wire 127 of each second sensing electrode unit. Basically, assuming that a proximity area falls only at the first sensing electrode row, the position calculation of the first direction is mainly associated with first-direction positions of multiple sensing electrode units having sensed capacitance changes that are greater than a threshold. Assuming there are multiple sensors having sensed capacitance changes that are greater than a threshold, these capacitance changes are regarded as weightings, based on which the first-direction positions of the first sensing electrode units are weighted averaged to obtain a value in a sensed coordinate position corresponding to the first direction. Further, in the sensed coordinate position, a value corresponding to the second direction is mainly associated with a proximity area occupied by the first electrode 120 and the second electrode 122. Similarly, when the proximity area falls only at the second sensing electrode row, a calculation may be similarly performed according to the above method. One person skilled in the art can understand that, the calculations for the first sensed coordinates and the second sensed coordinates are well-known to those skilled in the art, and shall be omitted herein. When the proximity area purely falls at the first sensing electrode row or the second sensing electrode row, the above first sensed coordinates or second sensed coordinates represent the real coordinate position. Assuming that the proximity area simultaneously covers the first sensing electrode row and the second sensing electrode row, the following weighted calculation is performed on the first sensed coordinates and the second sensed coordinates according to respective total capacitance changes C1 and C2 of the first sensing electrode row and the second sensing electrode row to obtain final sensed coordinates (X, Y).

$$X = X1 \cdot \frac{C1}{C1+C2} + X2 \cdot \frac{C2}{C1+C2}$$

$$Y = Y1 \cdot \frac{C1}{C1+C2} + Y2 \cdot \frac{C2}{C1+C2}$$

Between each sensing electrode unit pair 110 is a gap or wire region reserved for the second wire 123, the third wire 125 and the fourth wire 127. Relatively speaking, the area that each electrode occupies on the substrate is reduced and the area that the wire regions occupy on the substrate is increased. In other words, when an external object such as a finger approaches the substrate, a ratio that the proximity falls in the area of the wire regions is increased, and a ratio that the proximity falls in the area of the electrodes is reduced.

Figure 2:
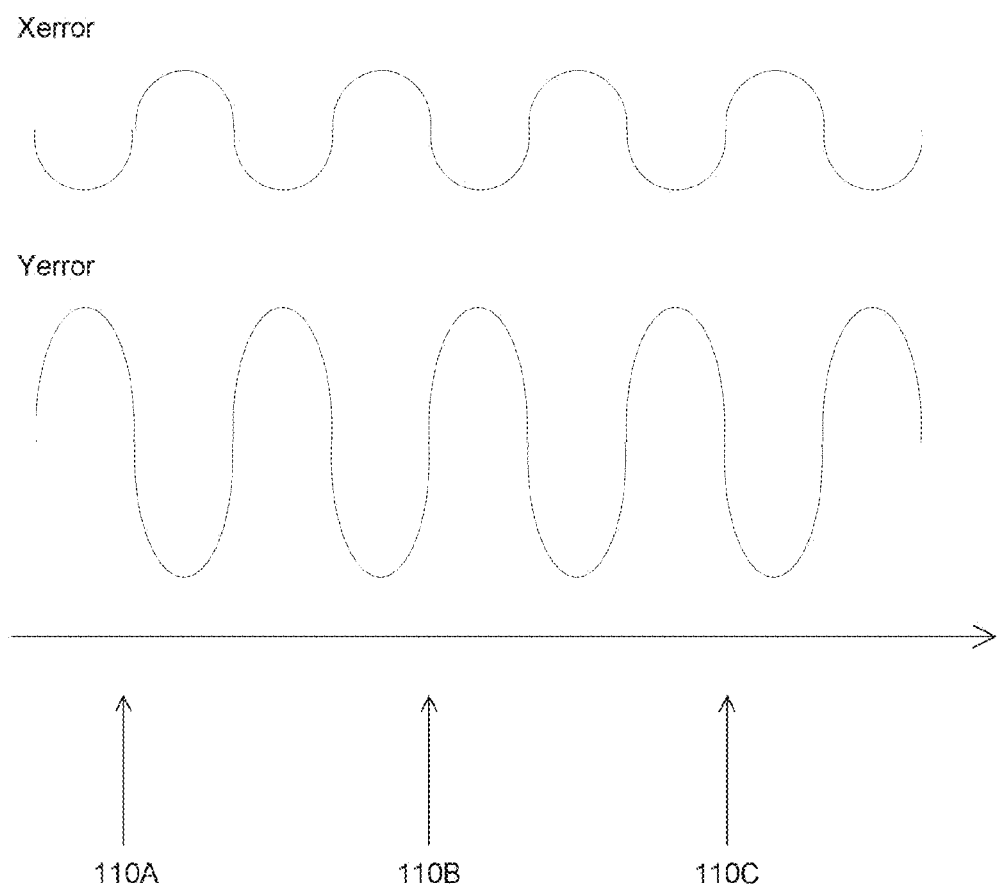
FIG. 2 is a schematic diagram of changes in errors in a sensed position.

FIG. 2 shows a schematic diagram of changes in errors in a sensed position. When an external object such as a finger moves along the first axial direction, errors in the sensed position corresponding to the first axial direction and the second axial direction are respectively $X_{error}$ and $Y_{error}$, which have changes that appear as sine waves, or referred to as a ripple effect, as shown in FIG. 2.

Figure 3A:
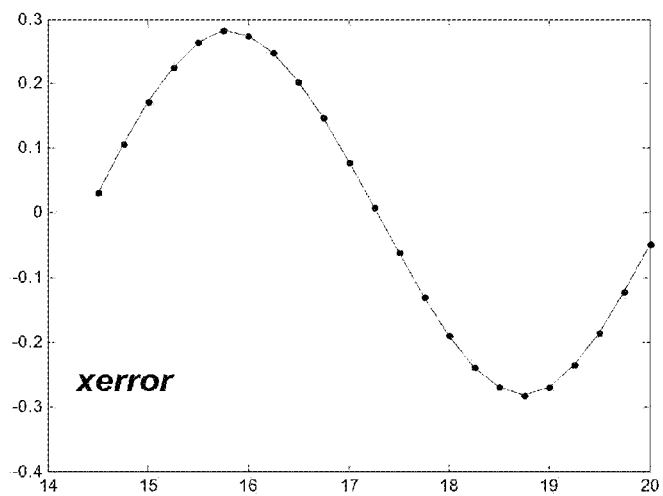
FIG. 3A to FIG. 3C are simulated schematic diagrams of changes in errors in a sensed position.
Figure 3B:
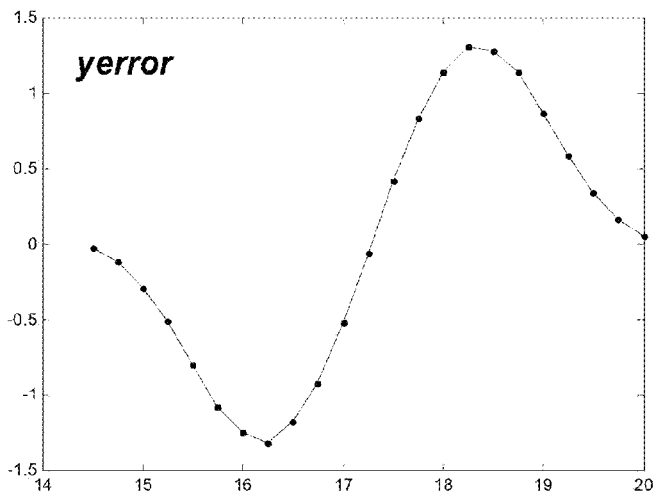
Figure 3C:
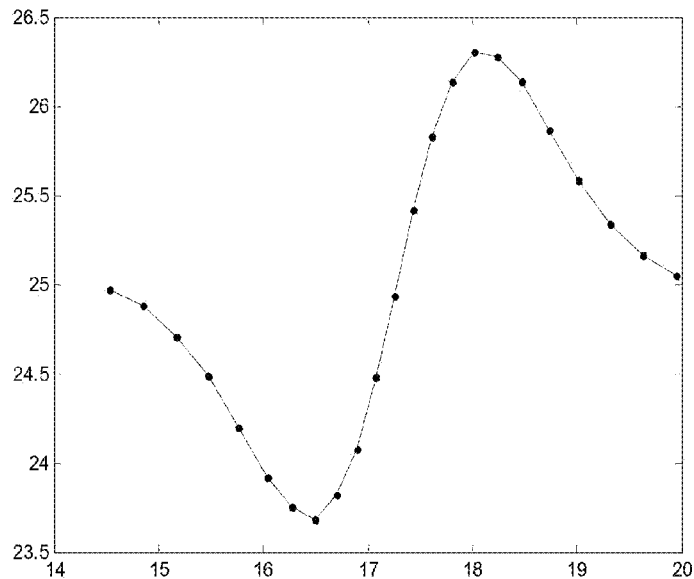

FIG. 3A to FIG. 3C show simulated schematic diagrams of changes in errors of a sensed position. In FIG. 3A, a curve represents an error $X_{error}$ in a sensed position in the first axial direction. In FIG. 3B, a curve represents an error $Y_{error}$ in a sensed position in the second axial direction. It is known from FIG. 2, FIG. 3A and FIG. 3B, the X-axis error $X_{error}$ in the sensed position in the first axial direction is not greater than the Y-axis error $Y_{error}$ in the sensed position in the second axial direction. The X-axis error $X_{error}$ is mainly resulted by geometric shapes of the electrodes 120, 122, 124 and 126, and need not be compensated at all or can be compensated by moving averaging as the error is quite small. A curve in FIG. 3C represents an error track formed by the calculated sensed coordinates.

When a proximity center/center of gravity of the external object falls at a center of the bar, with a balanced ratio of the corresponding electrodes to the proximity area occupied by the electrodes, the error in the sensed position is the smallest. Similarly, when the proximity center/center of gravity of the external object falls at a center of the wire region, with a balanced ratio of the corresponding electrodes to the proximity area occupied by the electrodes, the error in the sensed position is also the smallest. However, when the proximity center/center of gravity of the external object falls between the two above positions, since the ratio of the corresponding electrodes to the proximity area occupied by the electrodes gradually loses its balance, the error in the sensed position is increased. In other words, as seen from FIG. 3A to FIG. 3C, a position where the error inverts is a position where an absolute error is the smallest, i.e., when the proximity center/center of gravity of the external object falls at the center of the bar or at the center of the wire region. For example, when the error $Y_{error}$ in the sensed position in the second axial direction is a positive value, it means that the sensing value(s) of the second electrode 122 and/or the fourth electrode 126 is/are inadequate. Conversely, when the error $Y_{error}$ in the sensed position in the second axial direction is a negative value, it means that the sensing value(s) of the first electrode 120 and/or the third electrode 124 is/are inadequate.

It is understood from FIG. 3A to FIG. 3C that, the error $Y_{error}$ substantially displays a waveform of a sine function or a cosine function, and is mainly associated with at least one of: the proximity area, a distance between two adjacent sensing electrode unit pair of the plurality of sensing electrode unit pairs in the first direction, a distance between the first electrode 120 and the adjacent first electrode 120 in the first direction (i.e., a distance between the bars), and lengths of two sides when the first electrode is a polygon having the two sides parallel to the first direction. In other words, once the shapes of the sensing electrodes and routing layout on the substrate are determined, parameters other than the proximity area have also been determined. By assuming a range of the proximity area, a range of the error $Y_{error}$ can be determined according to the above predetermined parameters and a dynamically generated sensed coordinate position. Accordingly, a coordinate compensation value is generated by the calculated errors $X_{error}$ and $Y_{error}$, and then utilized to compensate the sensed coordinate position to obtain a coordinate position.

Figure 4:
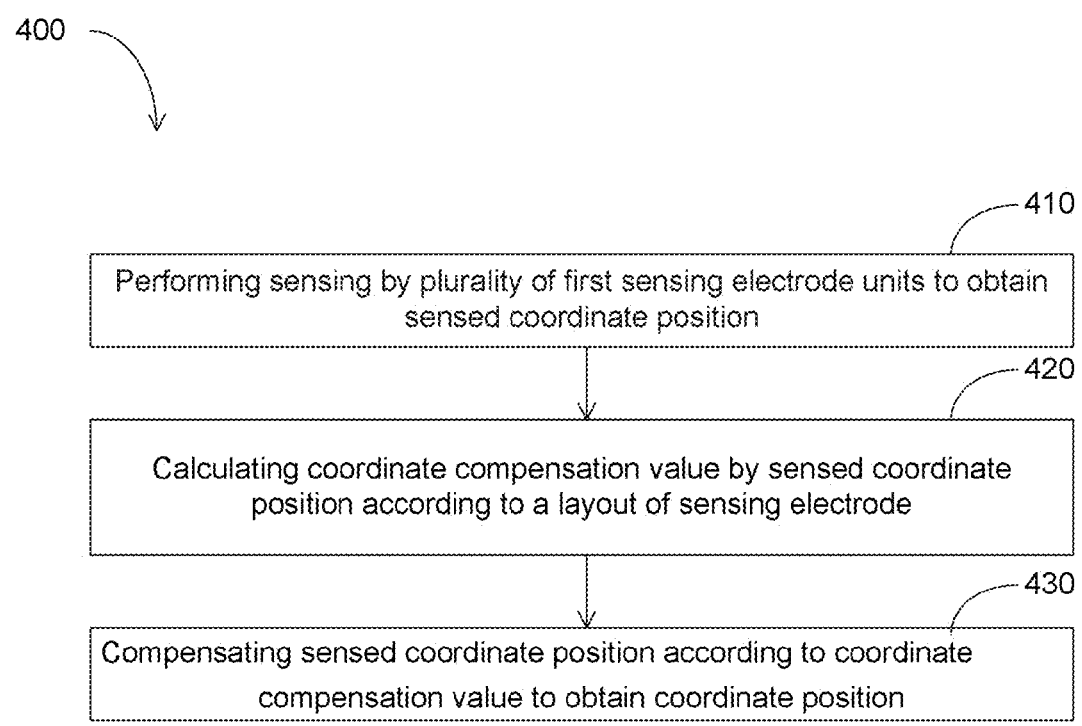
FIG. 4 is a flowchart of a sensing method for a touch control apparatus according to an embodiment of the present invention.

FIG. 4 shows a flowchart of a sensing method for a touch control apparatus according to an embodiment of the present invention. For example, the sensing method 400 is applicable to the sensing electrode 100 shown in FIG. 1A. However, it should be noted that the present invention does not limit the application scope of the sensing method 400 to only the sensing electrode 100 in the embodiment in FIG. 1A.

In step 410, performing sensing with the plurality of first sensing electrode units to obtain a sensed coordinate position. That is, a capacitance sensing value that the first electrode 120 senses is received by the first wire 121, a capacitance sensing value that the second electrode 122 senses is received by the second wire 123, and a calculation is performed based on these capacitance sensing values to obtain a sensed coordinate position.

In step 420, the sensed coordinate position is calculated according to the layout of the sensing electrode 100 to obtain a coordinate compensation value. As the sensed coordination position is associated with the layout of the sensing electrode 100, the error in the sensed coordinate position can be obtained to further calculate a coordinate compensation value.

In step 430, the sensed coordinate position is compensated according to the coordinate compensation value to obtain a coordinate position.

In one embodiment, in the coordinate compensation value, a value corresponding to a second direction is a coordinate compensation function of a value in the coordinate compensation value corresponding to a first direction. In another embodiment, the coordinate compensation function is a sine function, a cosine function, or is associated with a function for compensating a triangle wave. In yet another embodiment, the coordinate compensation function is associated with at least one of: the proximity area, a distance between two adjacent sensing electrode unit pair of the plurality of sensing electrode unit pairs in the first direction, a distance between the first electrode and the adjacent first electrode in the first direction, and lengths of two sides when the first electrode is a polygon having the two sides parallel to the first direction. When the value of the coordinate compensation value in the second direction is zero, the value of the coordinate compensation value in the first direction is equal to one of: an intermediate value of two adjacent first sensing electrode units in the first direction, and an intermediate value of each of the first sensing electrode units in the first direction.

FIG. 1B shows a schematic diagram of a sensing electrode according to another embodiment of the present invention. Compared to FIG. 1A, one main difference between FIG. 1B and FIG. 1A is that, a fourth wire 127B of a sensing electrode unit pair 110B routes to below the fourth electrode 126 of the sensing electrode unit pair 110A and routes to the top via a border of the touch sensing region. Further, for the fourth electrode 126 of the sensing electrode unit pair 110C, the fourth wire 127C routes to below the fourth electrodes 126 of the left adjacent sensing electrode pairs 110A and 110B and then to the top via a border of the touch control region. In FIG. 1B, although the fourth wires 127A to 127C of the three sensing electrode unit pairs 110A to 110C route to the top via the left border of the touch control region, one person skilled in the art can understand that the fourth wire 127 of the sensing electrode unit pair near the right border of the touch control region may route to the top via the right border of the touch control region. As shown in FIG. 1A, the fourth wire 127 of the sensing electrode unit pair near a center of the touch control region may route to the top via between the sensing electrode unit pair. In other words, the fourth wires 127 of certain sensing electrode unit pairs may first route around other sensing electrode pairs and to the border of the sensing electrode 100, and then couple to the logic circuit of the touch control apparatus along the second direction.

Similar to FIG. 1A, the sensing electrode 100 in FIG. 1B may also perform sensing by utilizing the sensing method 400 in FIG. 4 to obtain a coordinate position. Further, due to certain fourth wires 127 collectively routed to the border region in FIG. 1B, such parts need to be additionally compensated. In other words, given an appropriate adjustment on the coordinate compensation value, the sensing method 400 in FIG. 4 is applicable to different sensing electrodes.

Figure 5A:
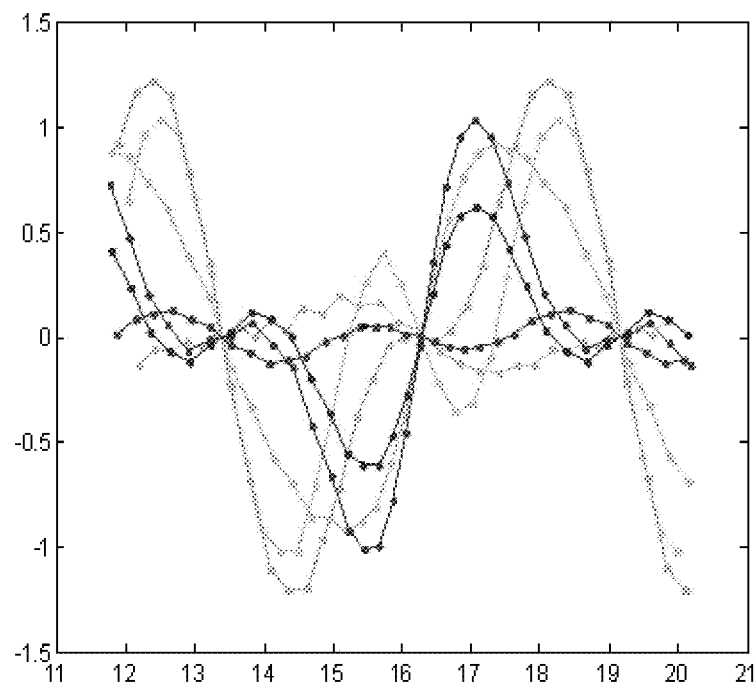
FIG. 5A is a simulated schematic diagram of sensing errors before applying the sensing method according to an embodiment of the present invention.
Figure 5B:
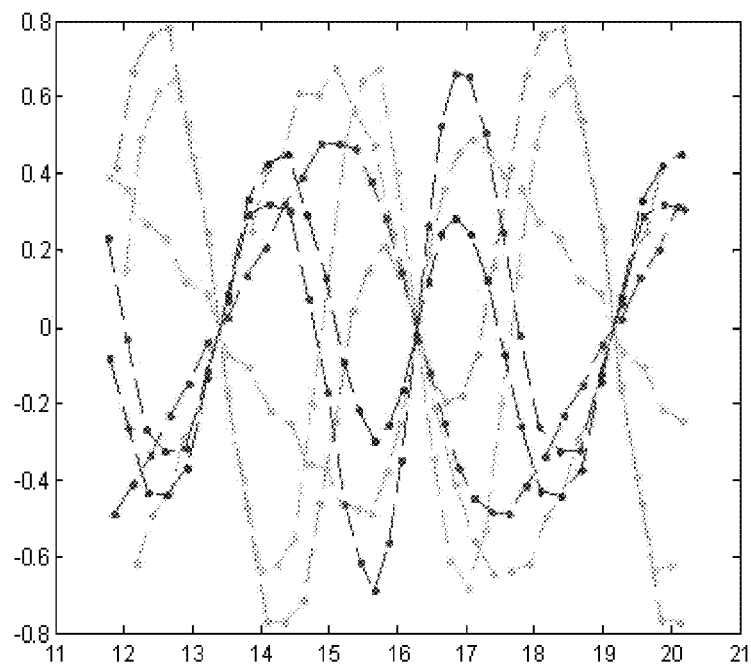
FIG. 5B is a simulated schematic diagram of sensing errors after applying the sensing method according to an embodiment of the present invention.

FIG. 5A shows a simulated schematic diagram of sensing errors before applying the sensing method according to an embodiment of the present invention. In FIG. 5A, seven lines respectively represent tracks of sensed positions obtained by a conventional sensing method for different proximity areas. It is observed that the maximum $Y_{error}$ in the second direction reaches as large as ±1.3 mm. FIG. 5B shows a simulated schematic diagram of sensing errors after applying the sensing method according to an embodiment of the present invention. It is observed that the maximum error $Y_{error}$ in the second direction is reduced to ±0.8 mm. Therefore, the present invention does improve the above-mentioned ripple effect.

FIG. 10 shows a schematic diagram of a sensing electrode according to another embodiment of the present invention. Compared to FIG. 1A, one main difference between the embodiments in the two diagrams is a plurality of dummy lines between a plurality of sensing electrode unit pairs. In the sensing electrodes 100 in FIG. 10 to FIG. 1E, the plurality of dummy lines coupled to dummy sensors are for compensating a capacitance sensing imbalance resulted by gaps between the sensing electrode unit pairs 110.

As shown in FIG. 10, the plurality of sensing electrode unit pairs 110 include three sensing electrode unit pairs 110A, 110B and 110C. Between the sensing electrode unit pairs 110A and 110B is a dummy line 130A; between the sensing electrode unit pairs 110B and 110C is a dummy line 130B. Thus, in one embodiment, when the sensing electrode 100 includes N sensing electrode unit pairs 110, the sensing electrode includes (N−1) dummy lines, which are respectively arranged between the N sensing electrode unit pairs 100, where N is a positive integer greater than or equal to two. In another embodiment, (M−1) dummy lines may be arranged between every M sensing electrode unit pairs 110, where M is also a positive integer greater than or equal to two.

In one embodiment, the above dummy lines may be coupled to a logic circuit of the touch control apparatus, and more particularly, to an analog front end (AFE) circuit. In another embodiment, the above dummy lines may be coupled together at one side of the substrate, and then coupled to the above logic circuit. In such method, a coverage range of the dummy lines is vast, in a way that a coefficient of a compensation value for a proximity of multiple points and a single point (near or touching the proximity) needs to be dynamically calculated and adjusted. Thus, although this method saves the AFE circuit of the logic circuit, more complications may be incurred. Therefore, a coupling method for coupling the plurality of dummy lines to the logic circuit of the touch control apparatus is not limited by the present invention.

As shown in FIG. 1A, no dummy lines are present between the sensing electrode unit pairs of the sensing electrode 100. At this point, due to the gaps and wire regions for arranging the second wire 123, the third wire 125 and the fourth wire 127 need to be reserved between the respective sensing electrode unit pairs, relatively speaking, the area that the electrodes occupy on the substrate is reduced, and the area that the wire regions occupy on the substrate is increased. In other words, when an external object such as a finger approaches the substrate, a ratio of the proximity to the area of the wire regions is increased, and a ratio of the proximity to the area of the electrodes is reduced.

To compensate the above error, in the embodiment in FIG. 10, dummy lines are added between the respective sensing electrode unit pairs. That is to say, dummy lines are added into the wire regions. When an external object such as a finger approaches the substrate, capacitance is formed between the external object and the dummy lines. One main spirit of the present invention is to utilize the capacitance values additionally sensed by the dummy lines to compensate the errors generated by the original proximity area imbalance between the first to fourth electrodes.

For example, when the sensing value(s) of the second electrode 122 and/or the fourth electrode 126 is/are inadequate, the capacitance changes sensed by the dummy lines are utilized to compensate the capacitance change(s) of the second electrode 122 and/or the fourth electrode 126. Accordingly, an absolute value of the error $X_{error}$ of the sensed position in the second axial direction is reduced. In contrast, when the sensing value(s) of the first electrode 120 and/or the third electrode 124 is/are inadequate, the capacitance changes sensed by the dummy lines are utilized to compensate the capacitance change(s) of the first electrode 120 and/or the third electrode 124. Accordingly, an absolute value of the error $Y_{error}$ of the sensed position in the second axial direction is reduced.

Figure 6:
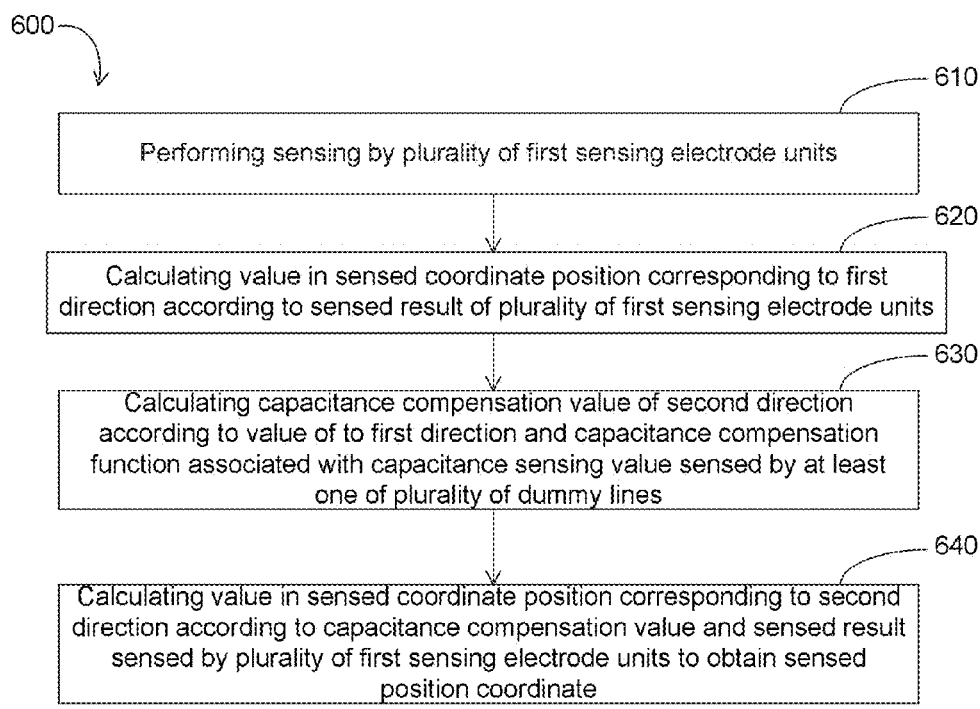
FIG. 6 is a flowchart of a sensing method for a touch control apparatus according to an embodiment of the present invention.

FIG. 6 shows a flowchart of a sensing method 600 for a touch control apparatus according to an embodiment of the present invention. The sensing method 600 is applicable to the sensing electrode 100 in FIG. 10, but is not limited to the embodiment in FIG. 10 by the present invention.

In step 610, sensing is performed by a plurality of sensing electrode units. That is, a capacitance sensing value sensed by the first electrode 120 is received by the first wire 121, and a capacitance sensing value sensed by the second electrode 122 is received by the second wire 123.

In step 620, a value in a sensed coordinate position corresponding to the first direction is calculated according to a sensed result of the plurality of first sensing electrode units.

In step 630, a capacitance compensation value of a second direction is calculated according to the value of the first direction and a capacitance compensation function associated with a capacitance sensing value sensed by at least one of a plurality of dummy lines.

In step 640, a value in the sensed coordinate position corresponding to the second direction is calculated according to the capacitance compensation value and the sensed result of the plurality of first sensing electrode units to obtain the sensed coordinate position.

In one embodiment, for example, as shown in FIG. 2 and FIG. 3A to FIG. 3C, an error in the second direction displays in a form analogous to a sine function. The capacitance compensation function is associated with a sine function, a cosine function, or a functional for compensation a triangle wave. In another embodiment, when the capacitance compensation value is zero, the value in the sensed coordinate position in the first direction is equal to one of: the value of the dummy line in the first direction, an intermediate value of two adjacent first sensing electrode units in the first direction, and an intermediate value of each of the first sensing electrode units in the first direction.

Figure 7:
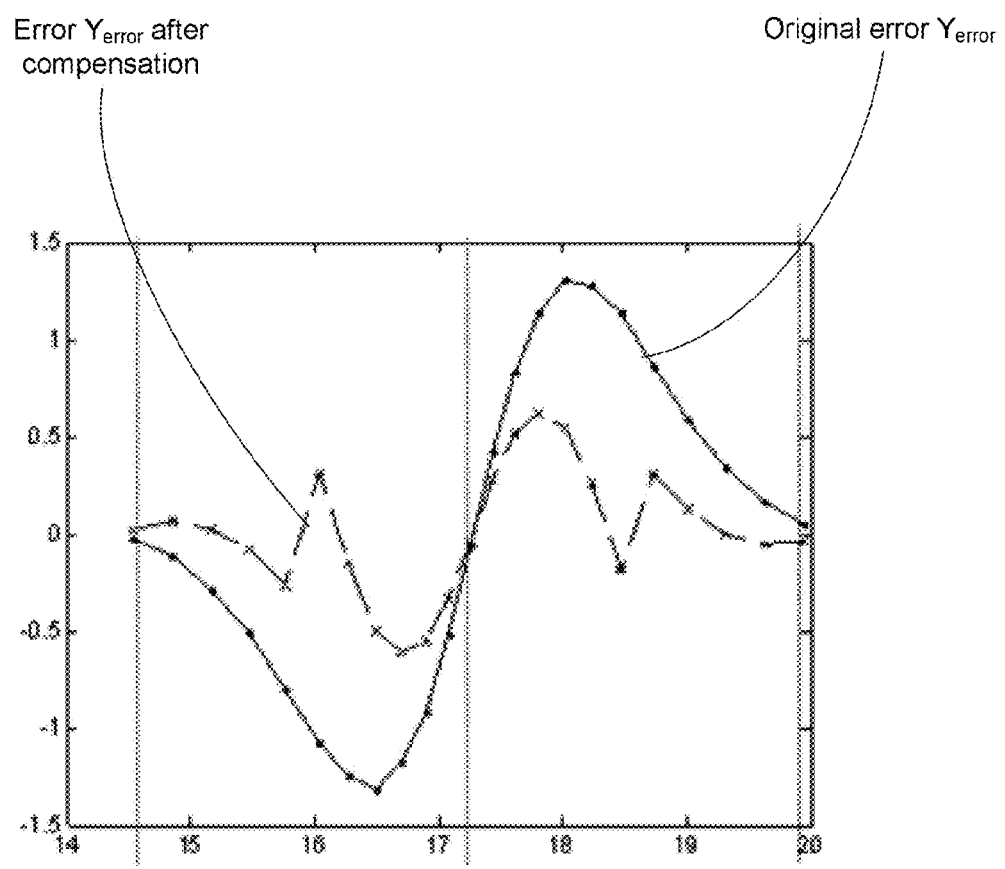
FIG. 7 is a simulated schematic diagram of a compensation effect according to an embodiment of the present invention.

FIG. 7 shows a simulated schematic diagram of a compensation effect according to an embodiment of the present invention. Before compensation, the original error $Y_{error}$ of the sensed position in the second axial direction is approximately between +1.5 and −1.5. After compensation with the capacitance values sensed by the dummy lines, the original error $Y_{error}$ of the sensed position in the second axial direction is reduce to between +0.5 and −0.5. Thus, it is apparent that the effect obtained after applying the present invention yields a diminished ripple effect.

FIG. 1D shows a sensing electrode 100 according to another embodiment of the present invention. Compared to FIG. 1C, one main difference between the two diagrams is that, the fourth wire 127B of the sensing electrode unit pair 110B first routes to below the fourth electrode 126 of the sensing electrode unit pair 110A, and then to the top via a border region of the touch control apparatus. This feature is similar to that of FIG. 1B. One main difference between FIG. 1D and FIG. 1B is that, the sensing electrode 100 in FIG. 1D includes a plurality of dummy lines, whereas the sensing electrode 100 in FIG. 1B does not include a plurality of dummy lines. Further, the fourth electrode 126 of the sensing electrode unit pair 110C also utilizes the fourth wire 127C to route to below the fourth electrodes 126 of the left adjacent sensing electrode pairs 110A and 110B, and then to the top via a border of the touch control region. In FIG. 1D, although the fourth wires 127A to 127C of the three sensing electrode unit pairs 110A to 110C route to the top via the left border of the touch control region, one person skilled in the art can understand that the fourth wire 127 of the sensing electrode unit pair near the right border of the touch control region may route to the top via the right border of the touch control region. As shown in FIG. 1C, the fourth wire of the sensing electrode unit pair near a center of the touch control region may route to the top via between the sensing electrode unit pair 110.

The sensing method in FIG. 6 is applicable to the sensing electrode shown in FIG. 1D. However, in FIG. 1D, certain fourth wires, e.g., the fourth wires 127B and 127C, are particularly long in length, and thus capacitance sensing values of these fourth wires need to be considered and accordingly compensated.

FIG. 1E shows a schematic diagram of a sensing electrode 100 according to another embodiment of the present invention. Compared to FIG. 10, lengths of the dummy lines 130A and 130B in FIG. 1E are shortened. The length of the dummy lines only extends to between the first sensing electrode unit but not to between the second sensing electrode unit. In other words, the dummy lines are only arranged between the first sensing electrode row 130 but not between the second sensing electrode row 140. In one embodiment, as a wire region between the second sensing electrode units of the second sensing electrode unit pair is narrowed, the second sensing electrode units in FIG. 1E are widened. In other words, widths of the second electrode 124 and the fourth electrode 126 are wider than those of the first electrode 120 and the second electrode 122. In another embodiment, the third electrode 124 and the fourth electrode 126 may have the same widths as the first electrode 120 and the second electrode 122.

It should be noted that, the features of FIG. 1D and FIG. 1E may be combined. That is, in one embodiment, the fourth wire routes to the top via the border of the touch control region, and the length of the dummy lines is extended to only between the first sensing electrode units or the first sensing electrode row 130.

The sensing method in FIG. 6 is applicable to the sensing electrode 100 in FIG. 1E and the embodiment that combines FIG. 1D and FIG. 1E. Certain fourth wires are particularly long in length, and thus capacitance sensing values of these fourth wires need to be considered and accordingly compensated.

Figure 8:
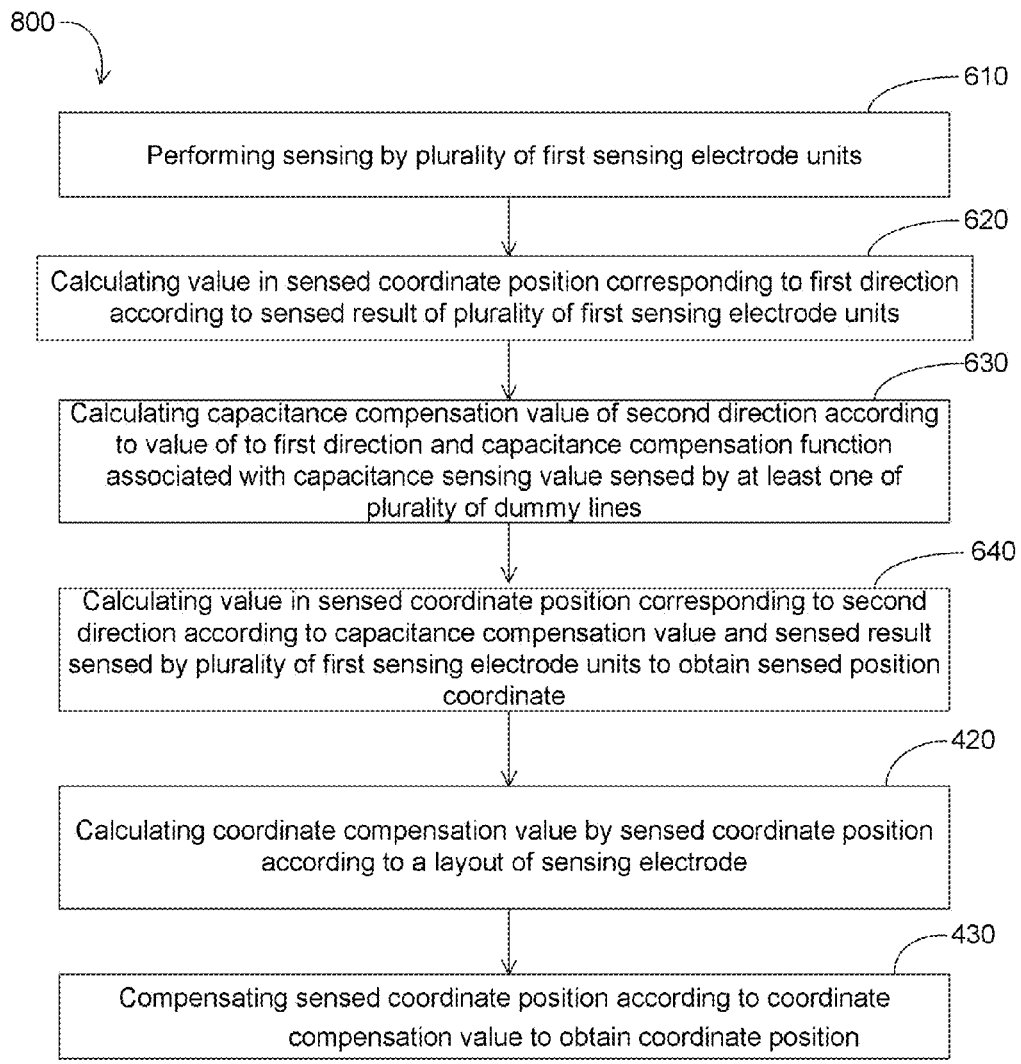
FIG. 8 is a flowchart of a sensing method for a touch control apparatus according to an embodiment of the present invention

For the sensing electrode 100 that includes the dummy lines 130, steps 420 and 430 in the sensing method may also be performed. After compensating the capacitance sensing value, a coordinate compensation value is calculated according to the sensed coordinate position. The sensed coordinate position is again compensated according to the coordinate compensation value to obtain a coordinate position. FIG. 8 shows a flowchart of a sensing method for a touch control apparatus according to an embodiment of the present invention. The sensing method 800 is applicable to the sensing electrode 100 shown in FIG. 1C to FIG. 1E, and to an embodiment that combines FIGS. 1D and 1E, given that the sensing electrode 100 of the embodiment includes a plurality of dummy lines 130.

Step 610 to step 640 of the sensing method 800 are identical to step 610 to step 640 of the sensing method 600, and shall be omitted herein. After step 640, steps 420 and 430 may be performed to calculate a coordinate position by utilizing the sensed coordinate position according to the layout of the sensing electrode, and to compensate the sensed coordinate position according to the coordinate compensation value to obtain a coordinate position. Details associated with the coordinate compensation value may be referred from steps 420 and 430, and shall be omitted herein. As compensation based on the capacitance compensation value is previously performed, a coefficient of the coordinate compensation value may be not as large.

In conclusion, in the present invention, a plurality of dummy lines are arranged between a plurality of sensing electrode pair units to compensate a capacitance sensing value imbalance caused by two sensing electrodes. Further, according to a coordinate compensation value calculated according to the electrodes and the wire layout, a ripple effect of a sensed position error resulted by the imbalance is alleviated or eliminated, thereby enhancing sensing accuracy of the touch control apparatus.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sensing method for a touch control apparatus, for sensing from a sensing electrode, the sensing electrode comprising a plurality of first sensing electrode units arranged in a first direction and a plurality of dummy lines arranged between the first sensing electrode units, the sensing method comprising:
   sensing with the first sensing electrode units;
   calculating a value in a sensed coordinate position corresponding to the first direction according to a sensed result of the first sensing electrode units;
   calculating a capacitance compensation value of a second direction according to the value of the first direction and a capacitance compensation function associated with a capacitance sensing value sensed by at least one of the dummy lines, wherein the second direction is perpendicular to the first direction; and
   calculating a value in the sensed coordinate position corresponding to the second direction according to the capacitance compensation value and a sensed result of the first sensing electrode units to obtain the sensed coordinate position.

2. The sensing method according to claim 1, further comprising:
   calculating a coordinate compensation value according to the sensed coordinate position; and
   compensating the sensed coordinate position according to the coordinate compensation value to obtain a coordinate position.

3. The sensing method according to claim 2, wherein the value in the coordinate compensation value corresponding to the second direction is a coordinate compensation function of a value in the coordinate compensation value corresponding to the first direction.

4. The sensing method according to claim 3, wherein the coordinate compensation function is associated with a sine function, a cosine function, or a function for compensating a triangle wave.

5. The sensing method according to claim 3, wherein each of the first sensing electrode units further comprises at least one first electrode and at least one second electrode corresponding to the at least one first electrode, and the coordinate compensation function is associated to at least one of:
   a proximity area;
   a distance of the first sensing electrode units in the first direction;
   a distance of the first electrode and the adjacent first electrode in the first direction; and
   when the first electrode is a polygon having two sides parallel to the first direction, lengths of the two sides.

6. The sensing method according to claim 1, wherein when a value in the coordinate compensation value corresponding to the second direction is zero, a value in the compensation value corresponding to the first direction is one of:
   an intermediate value of two adjacent first sensing electrode units of the first sensing electrode units in the first direction; and
   an intermediate value of each of the first sensing electrode units in the first direction.

7. The sensing method according to claim 1, wherein the coordinate compensation function is associated with a sine function, a cosine function, or a function for compensating a triangle wave.

8. The sensing method according to claim 1, wherein when the capacitance compensation value is zero, the value in the sensed coordinate position corresponding to the first direction is one of:
   a value of the dummy line in the first direction;
   an intermediate value of two adjacent first sensing electrode units of the first sensing electrode units in the first direction; and
   an intermediate value of each of the first sensing electrode units in the first direction.

9. The sensing method according to claim 1, wherein one of the dummy lines is arranged between every M sensing electrode units, where M is a positive integer greater than or equal to two.

10. The sensing method according to claim 1, wherein the sensing electrode comprises a plurality of sensing electrode units arranged along the first direction and the dummy lines arranged between the second sensing electrode units, and the first sensing electrode units are respectively corresponding to the second sensing electrode units.

11. The sensing method according to claim 10, wherein the dummy lines are arranged between the first sensing electrode units of the sensing electrode unit pairs but not between the second sensing electrode units of the sensing electrode unit pairs.

12. A sensing electrode, formed on a substrate of a touch control apparatus, the sensing electrode comprising a plurality of sensing electrode unit pairs, each of the sensing electrode unit pairs comprising:
   a first sensing electrode unit, comprising at least one first electrode, a first wire coupled to the at least one first electrode, at least one second electrode corresponding to the at least one first electrode, a second wire coupled to the at least one second electrode; and
   a second sensing electrode unit corresponding to the first sensing electrode unit, comprising at least one third electrode, a wire coupled to the at least one third electrode, at least one fourth electrode corresponding to the at least one third electrode, and fourth wire coupled to the at least one fourth electrode,
   wherein the first electrode, the second electrode, the third electrode and the fourth electrode have one of following planar contours:
   a triangle; and
   a triangle-like trapezoid,
   wherein all of the first sensing electrode units of the sensing electrode unit pairs are arranged along a first direction to form a first sensing electrode row, all of the second sensing electrode units of the sensing electrode unit pairs are arranged along the first direction to form a second sensing electrode row, the sensing electrode further comprises a plurality of dummy lines arranged between the sensing electrode unit pairs, and the dummy lines are coupled to a logic circuit of the touch control apparatus along a second direction,
   wherein first electrode, the second electrode, the third electrode and the fourth electrode have a same shape, and
   wherein the sensing electrode is configured to:
   sense with the first sensing electrode unit;
   calculate a value in a sensed coordinate position corresponding to the first direction according to a sensed result of the first sensing electrode unit;
   calculate a capacitance compensation value of the second direction according to the value of the first direction and a capacitance compensation function associated with a capacitance sensing value sensed by at least one of the dummy lines, wherein the second direction is perpendicular to the first direction; and
   calculate a value in the sensed coordinate position corresponding to the second direction according to the capacitance compensation value and a sensed result of the first sensing electrode unit to obtain the sensed coordinate position.

13. The sensing electrode according to claim 12, wherein the first wire, the second wire, the third wire and the fourth wire of at least one of the sensing electrode unit pairs are coupled to a logic circuit of the touch control apparatus along the second direction.

14. The sensing electrode according to claim 12, wherein the first wire, the second wire and the third wire of at least one of the sensing electrode unit pairs are coupled to a logic circuit of the touch control apparatus along the second direction; the fourth wire of the at least one sensing electrode unit pair routes around the other electrode unit pairs to a border of the sensing electrode, and couples to the logic circuit of the touch control apparatus along the second direction.

15. The sensing electrode according to claim 12, wherein the sensing electrode unit pairs comprise a first sensing electrode unit pair comprising N first electrodes, N second electrodes, N third electrodes and N fourth electrodes, where N is greater than or equal to one.

16. The sensing electrode according to claim 12, wherein the sensing electrode unit pairs comprise a first sensing electrode unit pair comprising N first electrodes, N second electrodes, N third electrodes and N fourth electrodes, and a second sensing electrode unit pair comprising M first electrodes, M second electrodes, M third electrodes and M fourth electrodes, where M is not equal to N.

17. The sensing electrode according to claim 12, wherein a planar contour of the first electrode is equal to that of the third electrode, and a planar contour of the second electrode is equal to that of the fourth electrode.

18. The sensing electrode according to claim 12, wherein the dummy lines are arranged between the first sensing electrode units of the sensing electrode unit pairs but not between the second sensing electrode units of the sensing electrode unit pairs.

19. The sensing electrode according to claim 18, wherein a planar contour of the first electrode is similar to that of the third electrode, a planar contour of the second electrode is similar to that of a fourth electrode, a width of the third electrode along the first direction is wider than that of the first electrode, and a width of the fourth electrode along the first direction is wider than that of the second electrode.

20. The sensing electrode according to claim 12, wherein one of the dummy lines is arranged between every M sensing electrode unit pairs of the sensing electrode unit pairs, where M is a positive integer greater than or equal to two.

* * * * *